(12) United States Patent
Li et al.

(10) Patent No.: US 10,181,969 B2
(45) Date of Patent: Jan. 15, 2019

(54) HIGH PERFORMANCE RECEIVER WITH SINGLE CALIBRATION VOLTAGE

(71) Applicant: Intel Corporation, Santa Clara, CA (US)

(72) Inventors: Shenggao Li, Pleasanton, CA (US); Ji Chen, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/372,851

(22) Filed: Dec. 8, 2016

(65) Prior Publication Data

US 2018/0167240 A1   Jun. 14, 2018

(51) Int. Cl.
| | |
|---|---|
| *H04L 25/03* | (2006.01) |
| *H04B 1/16* | (2006.01) |
| *H04L 1/00* | (2006.01) |
| *H04L 25/02* | (2006.01) |
| *H04L 25/06* | (2006.01) |
| *H04B 1/12* | (2006.01) |

(52) U.S. Cl.
CPC ......... *H04L 25/03057* (2013.01); *H04B 1/16* (2013.01); *H04B 1/123* (2013.01); *H04L 1/0036* (2013.01); *H04L 25/0296* (2013.01); *H04L 25/063* (2013.01)

(58) Field of Classification Search
CPC ............... H04L 25/0296; H04L 25/063; H04L 25/03057; H04L 1/0015; H04L 1/0036; H04B 1/123; H04B 1/16; H03K 5/003
See application file for complete search history.

(56) References Cited

U.S. PATENT DOCUMENTS

| | | | |
|---|---|---|---|
| 9,100,229 B2 * | 8/2015 | Jing | H04L 25/03057 |
| 2014/0226707 A1 * | 8/2014 | Kaviani | H04L 25/03063 375/233 |
| 2015/0349991 A1 * | 12/2015 | Iyer | H04L 25/03146 375/233 |
| 2015/0358005 A1 * | 12/2015 | Chen | H03K 5/003 375/233 |
| 2016/0164633 A1 * | 6/2016 | Avner | H04L 1/0054 375/233 |
| 2016/0182260 A1 * | 6/2016 | Dong | H04L 25/03057 375/233 |
| 2017/0054448 A1 * | 2/2017 | Lye | H03M 1/1245 |
| 2017/0070373 A1 * | 3/2017 | Wei | H04L 25/063 |

* cited by examiner

*Primary Examiner* — Sophia Vlahos
(74) *Attorney, Agent, or Firm* — Compass IP Law PC

(57) ABSTRACT

An apparatus is described that includes a receiver. The receive includes a data sampler, a positive error sampler and a negative error sampler each having respective inputs coupled to a same differential channel. The receiver also includes circuitry to drive the respective inputs, the circuitry to place a same calibration voltage on the differential channel to calibrate each of the data sampler, positive error sampler and negative error sampler with the same calibration voltage.

17 Claims, 11 Drawing Sheets

200

203

US 10,181,969 B2

HIGH PERFORMANCE RECEIVER WITH SINGLE CALIBRATION VOLTAGE

FIELD OF INVENTION

The field of invention pertains generally to the electronic arts and, more specifically, to a high performance receiver with single calibration voltage.

BACKGROUND

The speed of internal communications within a computing systems are generally increasing with each new generation of underlying technology. The increasing speed raises design challenges for those tasked with building the communication links that physically transport the internal communications.

FIGURES

Figure 1A:
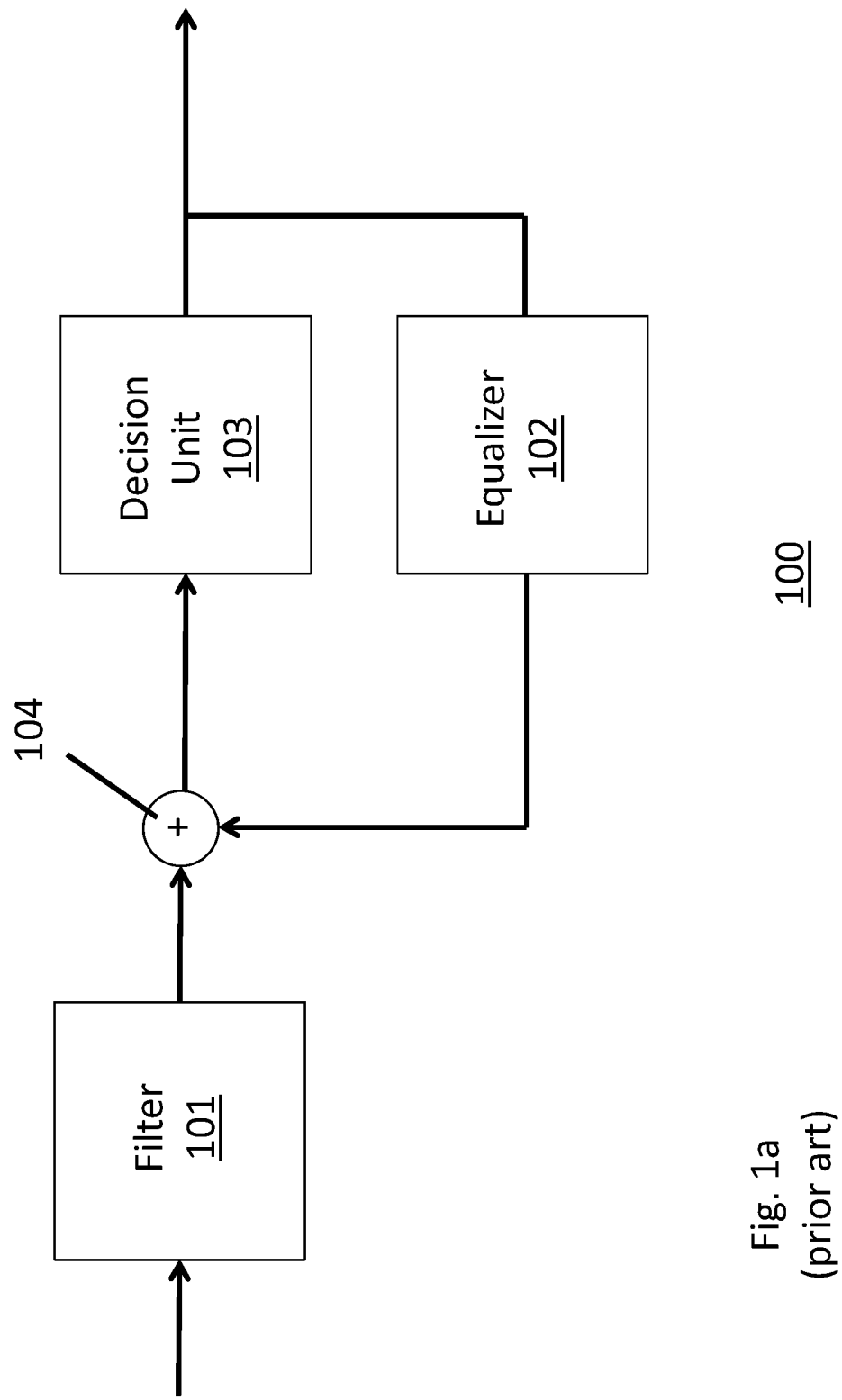
Figure 1B:
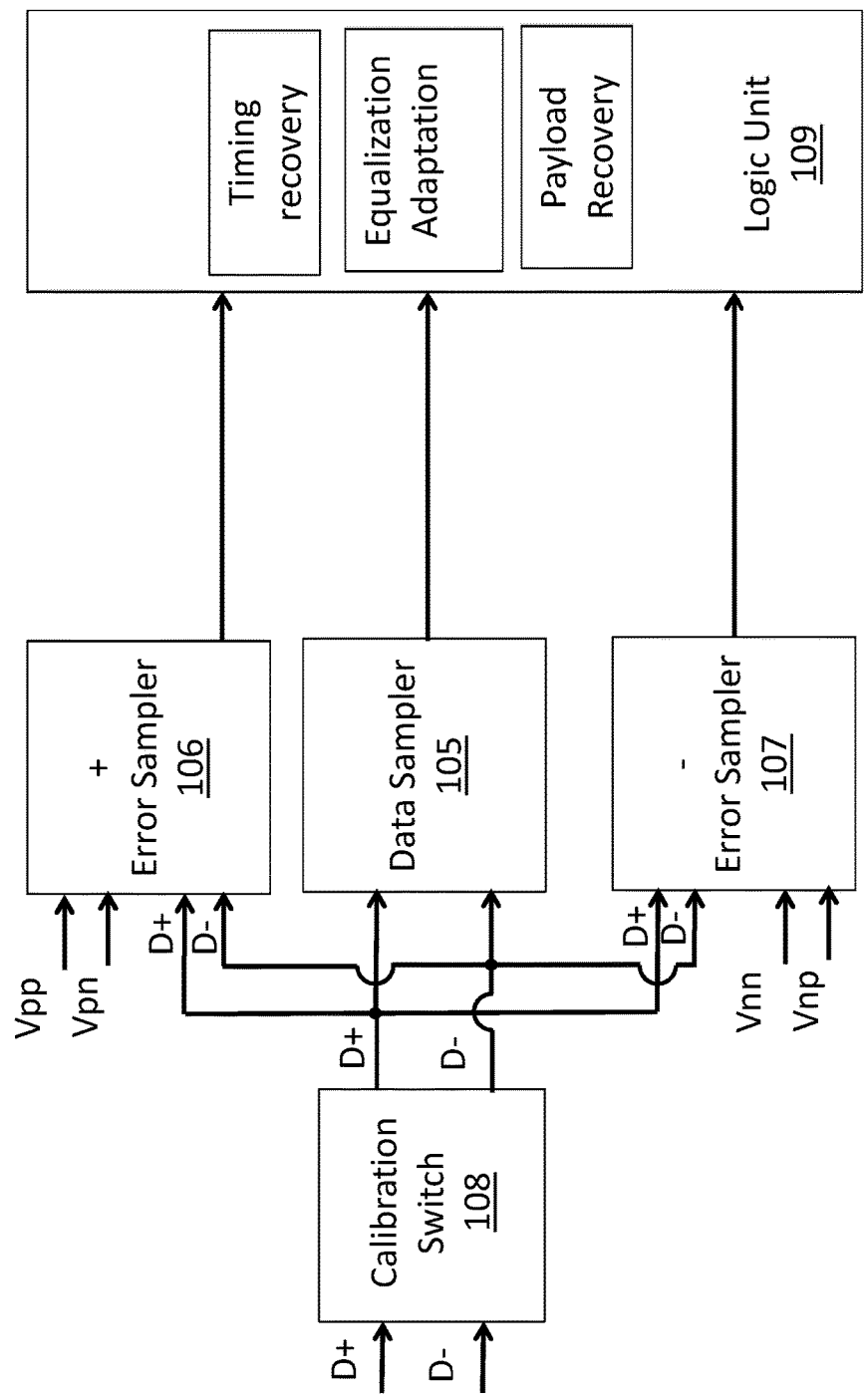
Figure 1C:
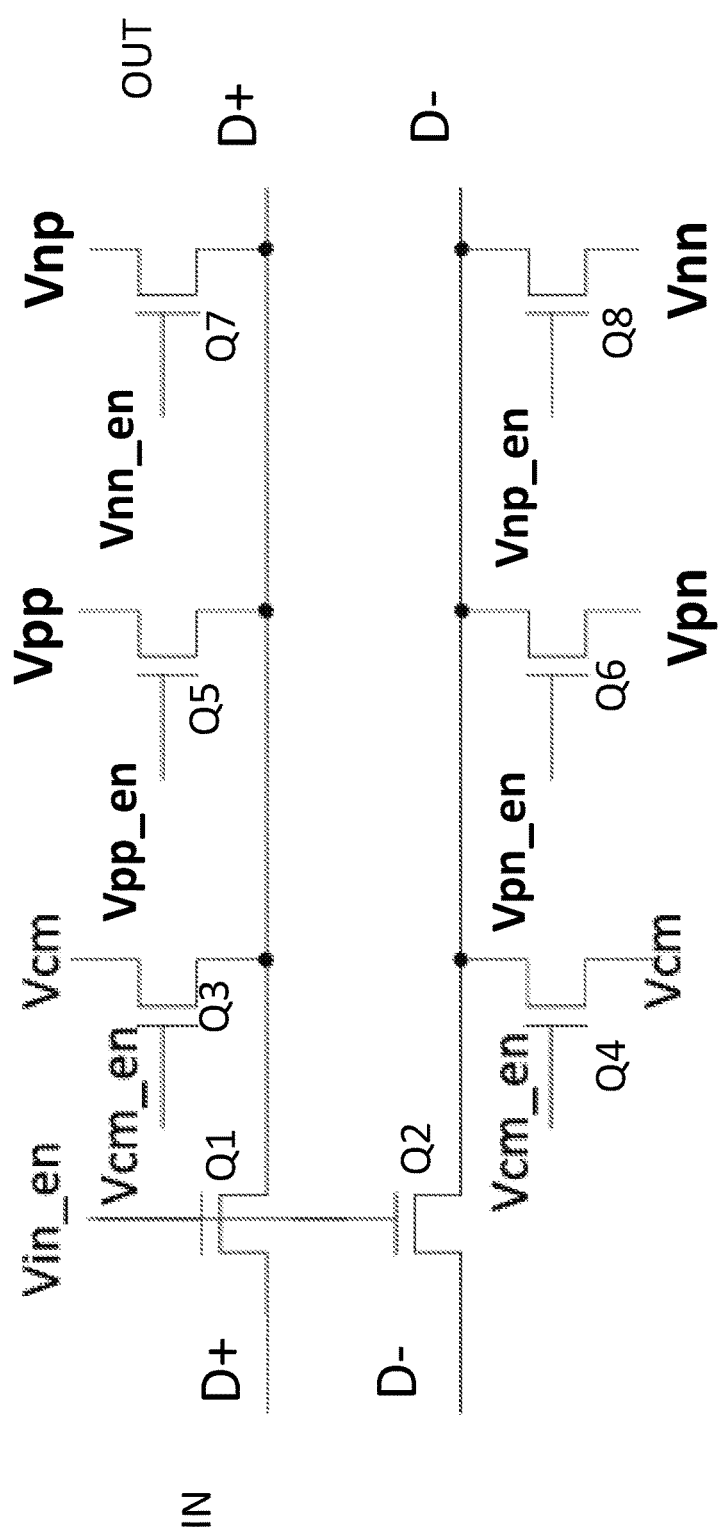
Figure 1D:
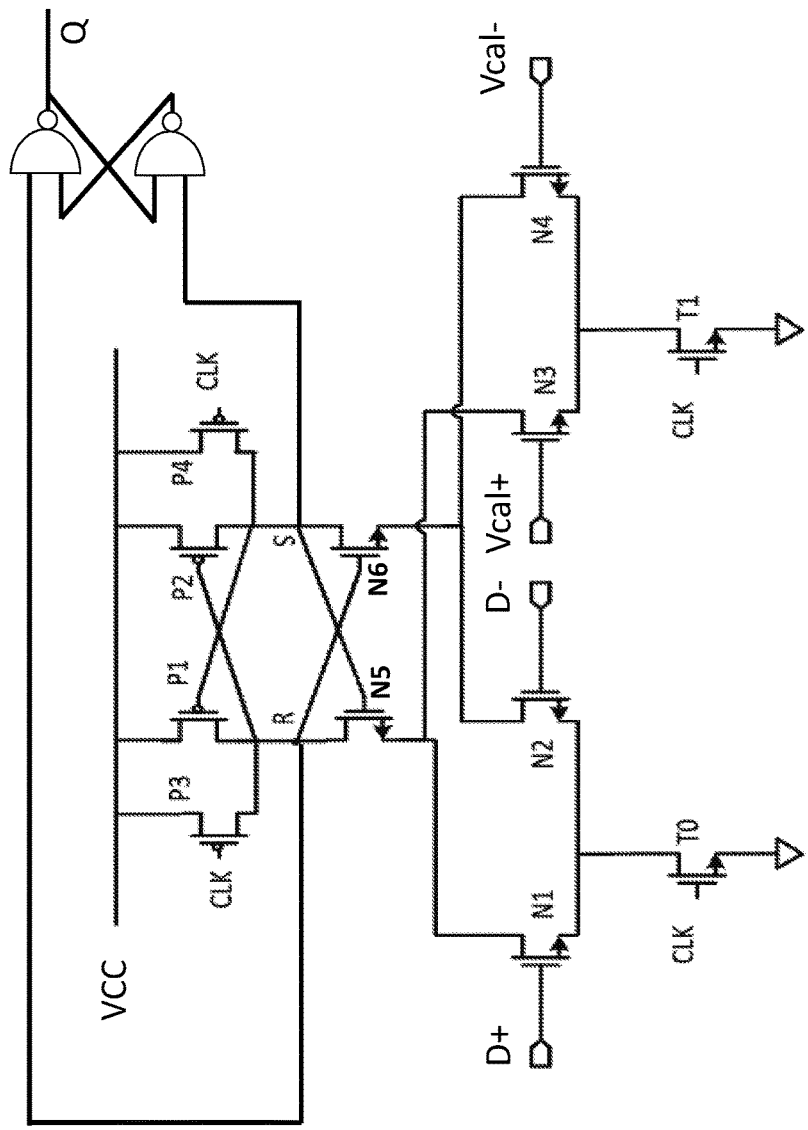
Figure 1E:
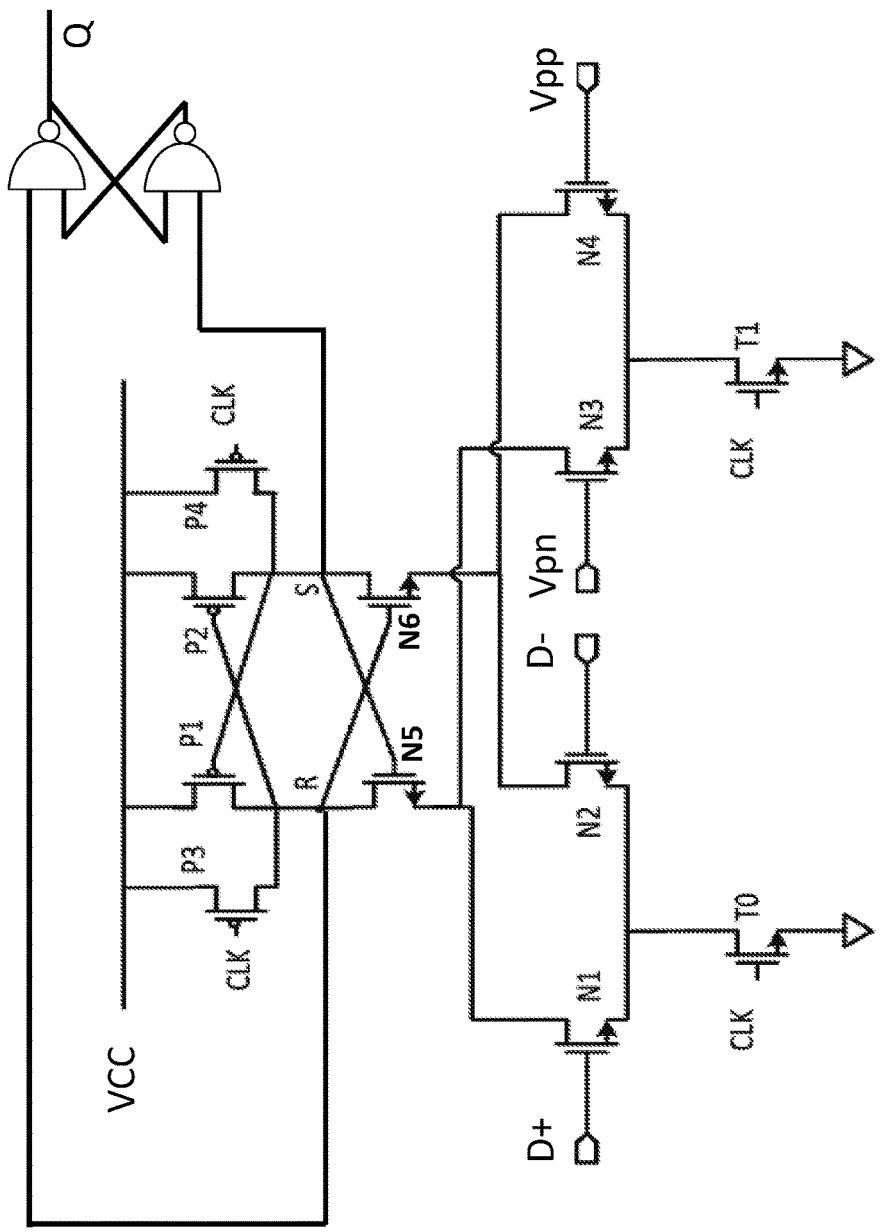
Figure 1F:
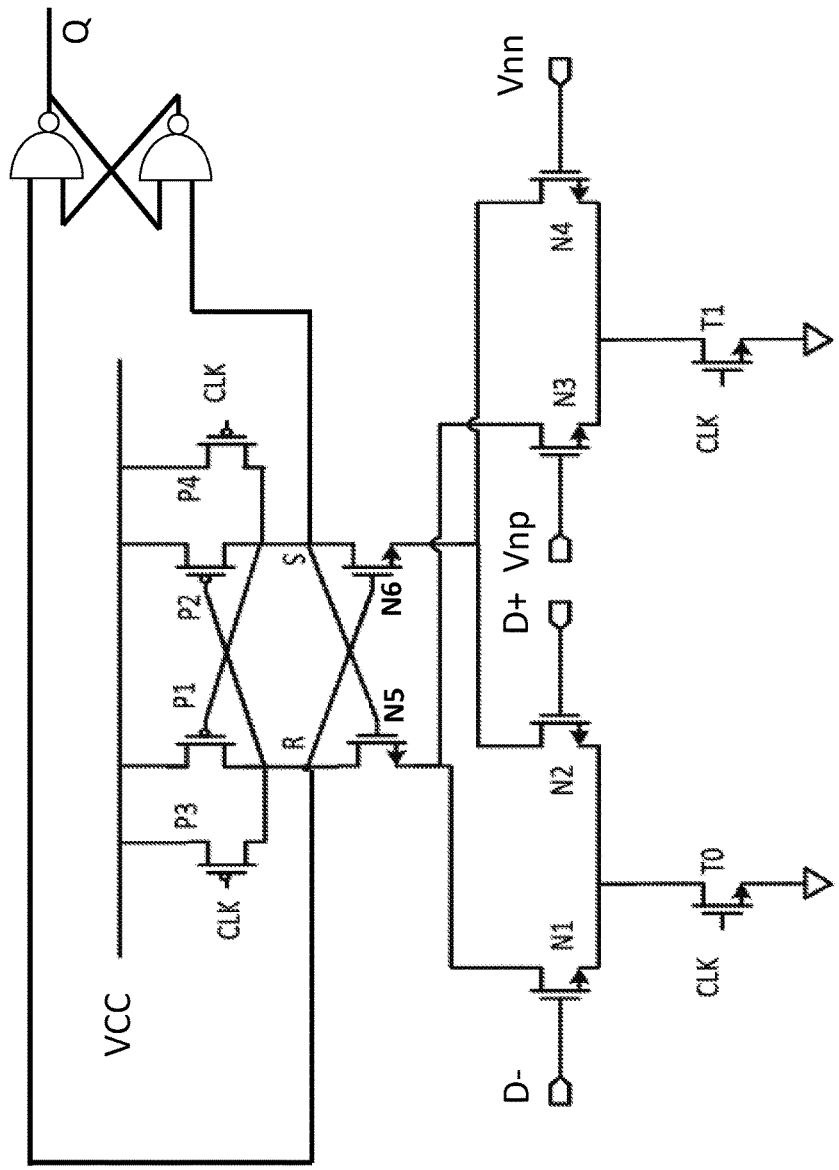
Figure 2A:
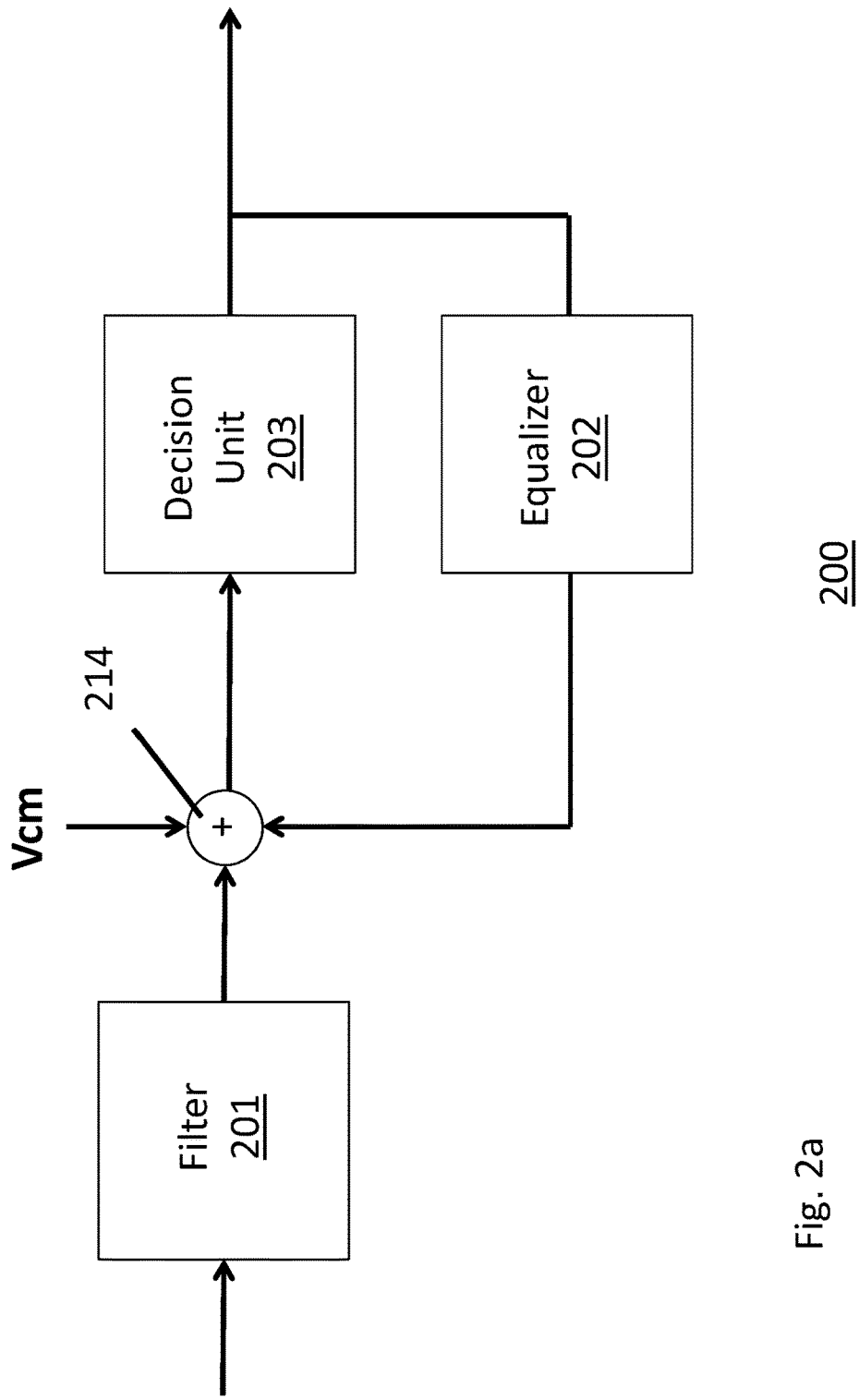
Figure 2B:
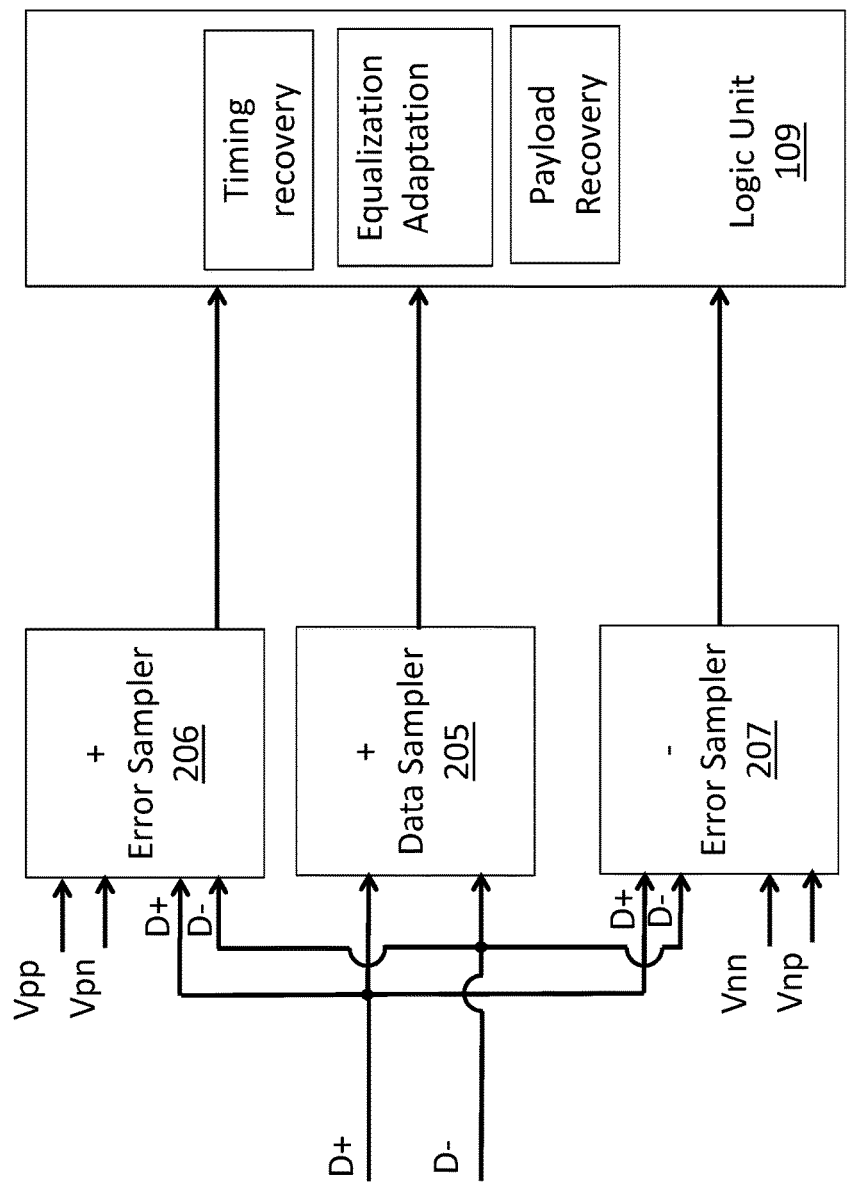
Figure 2C:
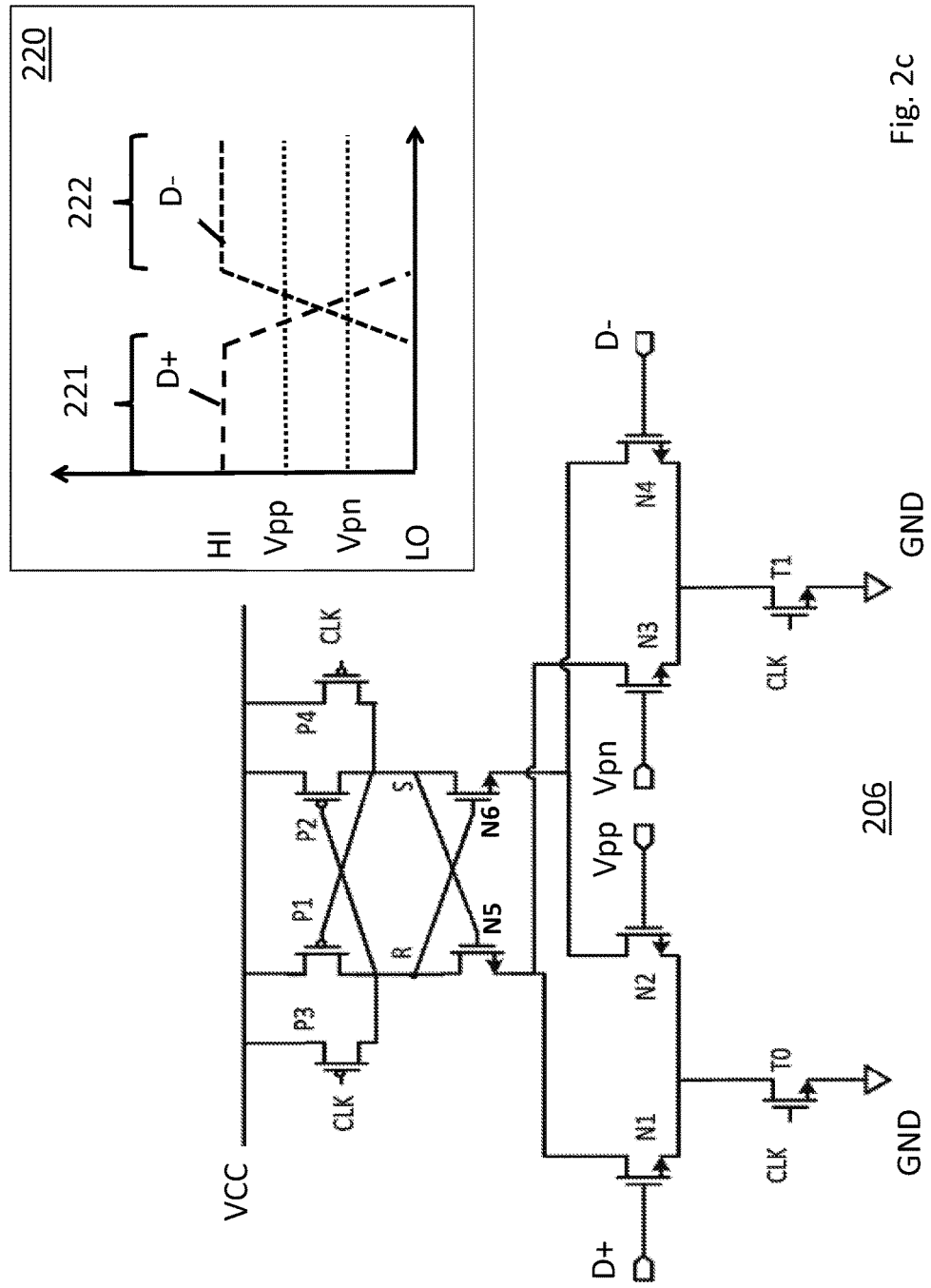
Figure 2D:
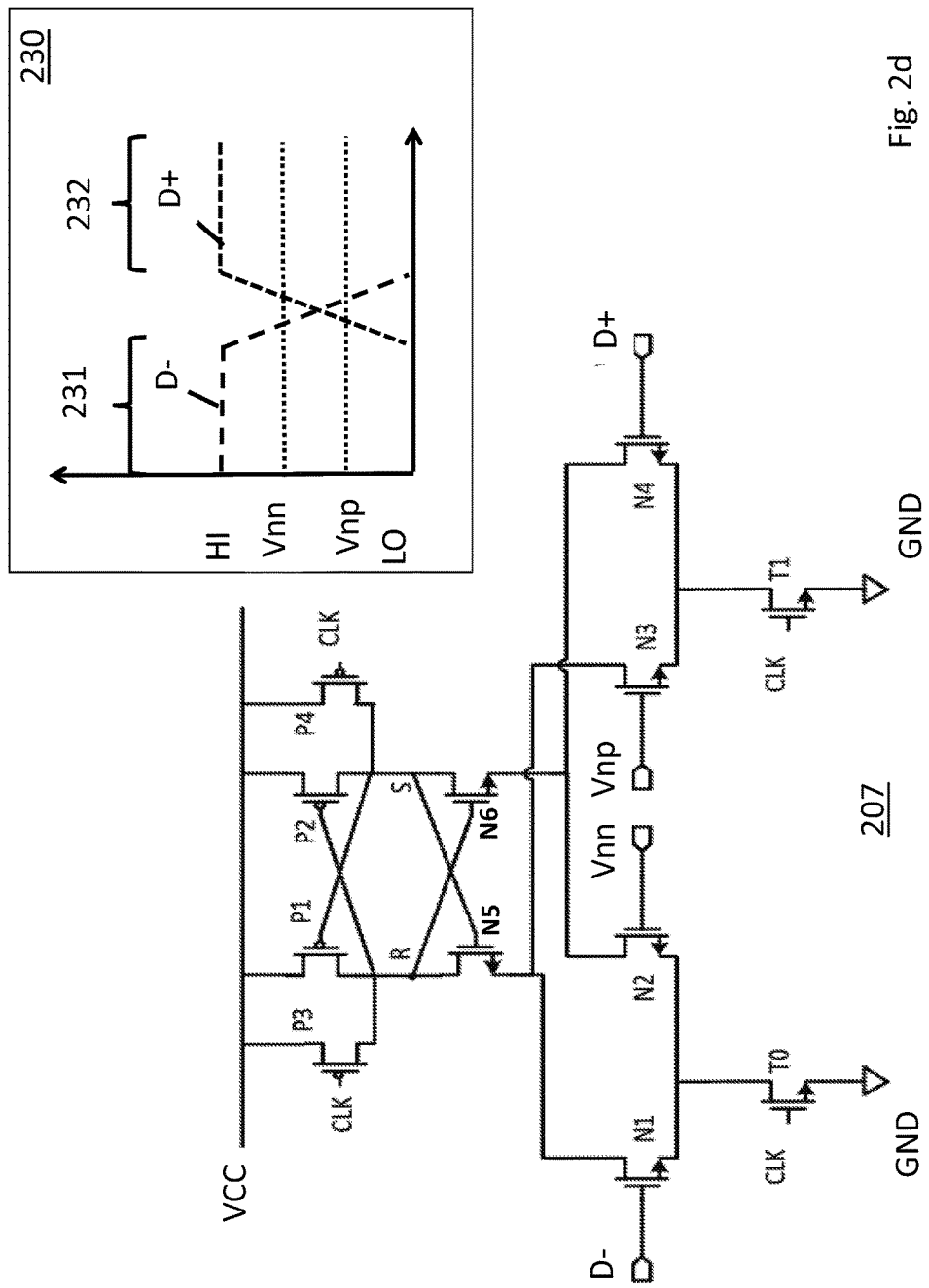
Figure 3:
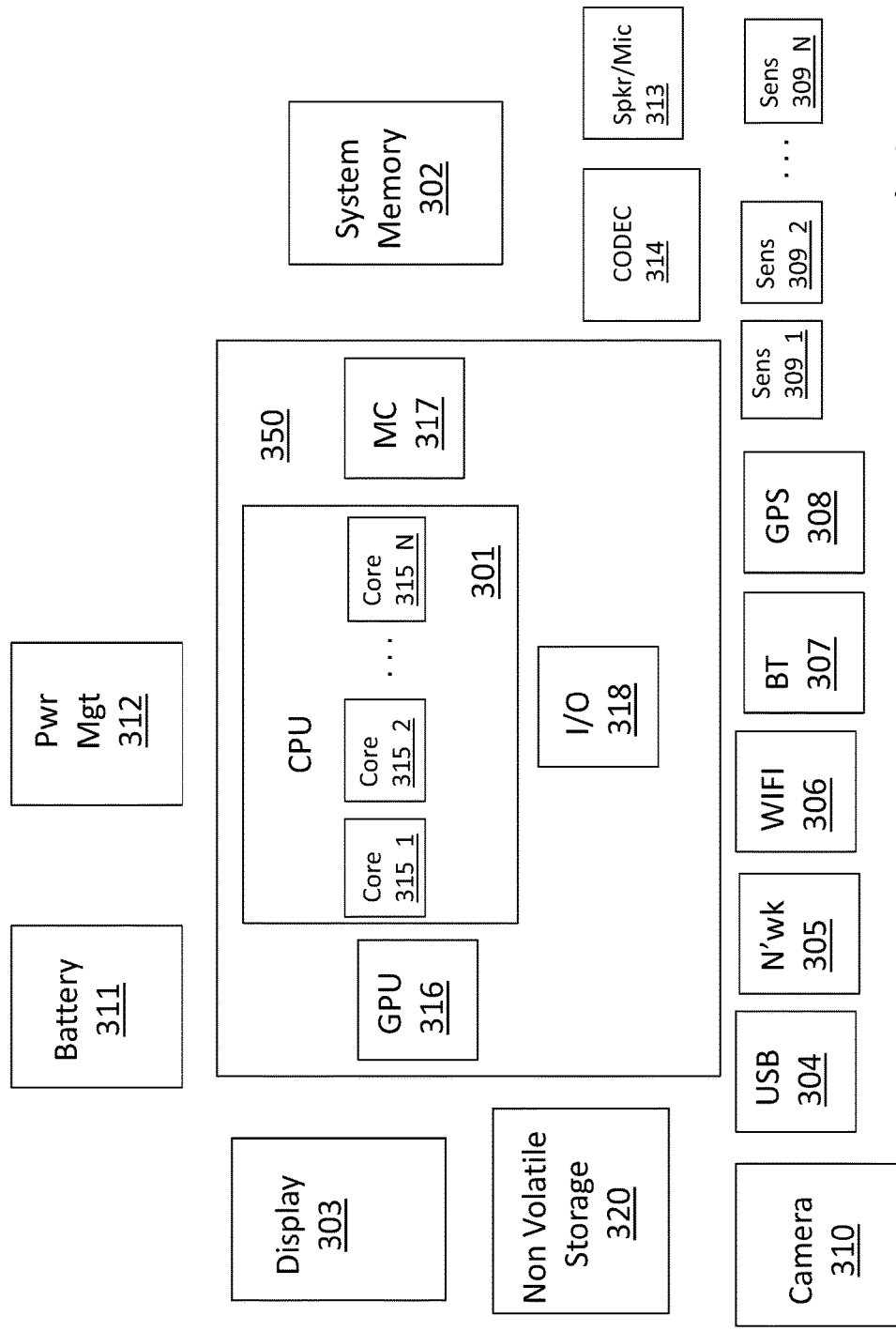

A better understanding of the present invention can be obtained from the following detailed description in conjunction with the following drawings, in which:

FIG. 1a shows a prior art receiver;
FIG. 1b shows a prior art channel within a decision unit;
FIG. 1c shows a prior art calibration switch;
FIG. 1d shows a prior art data sampler;
FIG. 1e shows a prior art positive error sampler;
FIG. 1f shows a prior art negative error sampler;
FIG. 2a shows an improved receiver;
FIG. 2b shows an improved channel within a decision unit;
FIG. 2c shows an improved positive error sampler;
FIG. 2d shows an improved negative error sampler;
FIG. 3 shows a computing system

DETAILED DESCRIPTION

Higher baud rate serial channels are more difficult to implement because of the distortion that can occur to the voltage waveform of the individual bits of the transmitted bit stream. For example, the shape of a rectangular pulse having sharp edges as originally transmitted may devolve into a more sinusoidal shape (the sharp edges are lost) over the course of its propagation over the channel. The sinusoidal shape causes neighboring pulses (i.e., pulses that were transmitted immediately before and/or after) to interfere with one another which, in turn, corresponds to the creation of inter-symbol interference noise and reduced signal-to-noise ratio on the channel.

With reduced signal-to-noise ratio, the distance and/or speed of the channel may need to be reduced. As such, sophisticated receivers are designed to compensate for detrimental effects on the channel, such as inter-symbol interference noise, to effectively improve the signal-to-noise ratio.

One such receiver, shown in FIG. 1a and referred to as decision feedback equalizer (DFE) 100, uses a past history of the received stream to affect the decisions being made as to whether the waveform shapes of the presently received bit stream correspond to a 1 or 0. As such, the output of a DFE unit 102 is fed to the input of the decision unit 103.

FIG. 1b shows a depiction of a prior art data decision processing channel 103 within the decision unit 103 of the DFE receiver of FIG. 1a. The main functional units along the channel include a data sampler 105, a positive error sampler 106 and a negative error sampler 107. According to the operation of the decision channel 103 of FIG. 1b, the data sampler 105 determines the logic value of the differential input signal (D+)-(D−) and the error sampler circuits 106, 107 respectively measure the amplitude of the + and − differential input signals (where (D+)-(D−) corresponds to the + differential signal and (D−)-(D+) corresponds to the − differential signal) against respective differential voltage reference levels. According to at least one type of DFE approach, the outputs of the data sampler 105 and error samplers 106, 107 are provided to logic unit 109. The logic unit performs timing recovery, equalization adaptation, and recovers the payload that was transmitted over the serial communication line.

Here, the presence of undesirable offsets within any of the sampler circuits 105, 106, 107 can lead to incorrect decisions. For example, if the data sampler 105 has an offset, it can incorrectly detect the differential state of the differential input signal (D+)-(D−). Likewise, if one of the error sampler circuits 106, 107 has an offset, it can incorrectly signify that the amplitude of the differential input signal is sufficiently high when in fact it is too low to recognize actual input data, or, incorrectly signify that the amplitude of the differential input signal is too low to recognize actual input data when in fact it is sufficiently high. With supply voltages currently at 1.0V or less, even small offsets (in the realm of 10-30 mv per sigma) can cause such detrimental errors in operation to occur.

As such, FIG. 1b also shows the presence of a calibration switch network 108 that is used to calibrate the data and error sampler circuits 105, 106, 107 to cancel out such offsets. A more detailed transistor level depiction of the switch network 108 is shown in FIG. 1c. Here, during a calibration sequence before the channel begins processing live data, the input enable transistors Q1, Q2 are disabled which effectively blocks the differential input signal D+, D− received at the channel input from passing through to the data sampler and error samplers circuits.

With the input being blocked, calibration voltages can be entered through corresponding switch pairs Q3/Q4, Q5/Q6 and Q7/Q8. For example, in order to calibrate the data sampler 105, transistors Q3 and Q4 are turned on with signal Vin_en and transistors Q5 through Q8 are off which couples a reference or common mode voltage Vcm (e.g., a potential halfway between a logic HI and a logic LO) on both of the D+ and D− outputs. With both the D+ and D− being set to the same reference potential Vcm, ideally, the data sampler 105 differential input is forced to zero. With zero differential input, the sampler 105 output should have a 50% probability of being a logic HI and a 50% probability of being a logic Low.

Thus, if in response to this particular input condition the data sampler 105 output presents a value that leans toward a particular logic level (for example, more than 50% probability of being a logic High or logic Low), the data sampler 105 has an internal offset that should be canceled out. FIG. 1d shows a transistor level embodiment of the data sampler 105. As observed in FIG. 1d, transistors N1 and N2 are part of a standard differential amplifier that indicates which of the positive data (D+) and negative data (D−) inputs is greater than the other. More specifically, if D+>D−, the differential output corresponds to a logic high (R=LO and S=HI). Here, the R and S nodes of FIG. 1d correspond to the R and S inputs of an RS flip-flop having output Q. With R=LO and S=HI the output (Q) of the RS flip-flop will be a logic HI. By contrast, if D−>D+, the differential output corresponds to a logic low (R=HI and S=LO), the output (Q) of the RS flip-flop will be a logic LO.

By contrast, transistors N3 and N4 are part of a second differential amplifier that is used to calibrate out any offsets. Here, during calibration when D+=D−=Vcm, if the data sampler output does not exhibit a 50% probability of being a logic high and a 50% probability of being a logic low, the Vcal+ and/or Vcal− inputs can be adjusted to position the data sampler outputs to the appropriate 50-50 High/Low ratio (for simplicity, FIG. 1b does not show the Vcal+ and Vcal− calibration voltage inputs to the data sampler 105). Here, the offset can be characterized as a tendency for the N1, N2 differential amplifier to pull current more strongly through either the R leg or the S leg rather than pulling currently equally through both legs. The bias voltages Vcal+, Vcal− are set in such a way that the combination of differential amplifiers N1/N2 and N3/N4 pulls current through both legs approximately equally rather than favoring one leg over the other.

FIG. 1e shows an embodiment of the positive error sampler 106. Here, comparing FIGS. 1d and 1e, note that the circuitry is identical except that the N3/N4 transistors, rather than being used for calibration, are used to establish the differential threshold that the error sampler compares against. Again, transistors N1 and N2 are part of a standard differential amplifier that indicates which of the positive data (D+) and negative data (D−) inputs is greater than the other. By contrast, the N3/N4 differential amplifier receives reference voltages Vpp and Vpn whose difference Vpp−Vpn corresponds to the differential amplitude threshold that the positive error sampler 106 makes decisions against.

More specifically, with Vpp nominally being set to be larger than Vpn, the output of the positive error sampler is nominally to S=LO and R=HI (that is, N4 pulls more current through the S leg than N3 pulls through the R leg). However if (D+)-(D−) becomes greater than Vpp−Vpn, then the positive error sampler output will flip to S=HI and R=LO which signifies the differential amplitude of the data signal is greater than the differential amplitude of the Vpp−Vpn threshold.

In order to calibrate the positive error sampler, referring to FIGS. 1c and 1e, the Q5/Q6 transistor pair is activated by activating control signals Vpp_en and Vpn_en (the other control signals turn off transistor pairs Q1/Q2, Q3/Q4 and Q7/Q8) which places the Vpp and Vpn reference voltages on the D+ and D− output signal lines respectively. Respectively setting the Vpp and Vpn reference voltages on the D+ and D− output lines effectively establishes the positive error sampler's threshold trigger on the D+, D− inputs. Under this condition, ideally, the output of the positive error sampler 106 should exhibit a 50% probability of being a logic HI and a 50% probability of being a logic LO.

If this 50-50 probability is not observed, a third differential pair of transistors that are added to the circuit in a shunt (parallel) arrangement with the other two differential pairs (N1/N2 and N3/N4), which are not shown in FIG. 1e for illustrative ease, are used to calibrate out the offset without adjustment to the Vpp and Vpn reference voltages.

Similarly, referring to FIG. 1f which shows an embodiment of the negative error sampler 107, the negative error sampler 107 is provided with reference voltages Vnn and Vnp whose difference Vnn−Vnp corresponds to the differential amplitude threshold that the negative error sampler makes decisions against. More specifically, with Vnn nominally being set to be larger than Vnp, the output of the negative error sampler 107 is nominally biased to S=LO and R=HI. However if (D−)-(D+) becomes greater than Vnn−Vnp, then the negative error sampler 107 output will flip to S=HI and R=LO which signifies the differential amplitude of (D−)-(D+) is greater than the Vnn−Vnp threshold.

In order to calibrate the negative error sampler 107, the Q7/Q8 transistor pair is activated by activating control signals Vnn_en and Vnp_en (the other control signals turn off transistor pairs Q1/Q2, Q3/Q4 and Q5/Q6) which places the Vnn and Vnp reference voltages on the D− and D+ output signal lines respectively. Respectively setting the Vnn and Vnp reference voltages on the D− and D+ output lines effectively establishes the negative error sampler's threshold trigger on the D_, D+ inputs. Under this condition, ideally, the output of the negative error sampler 107 should exhibit a 50% probability of a logic HI output and a 50% probability of a logic LO output.

If this state is not observed, a third differential pair of transistors (not shown in FIG. 1f for illustrative ease) that are coupled in a shunt (parallel) arrangement with the other two differential pairs (N1/N2 and N3/N4) are used to calibrate out the offset without adjustment to the Vnn and Vnp reference voltages.

A problem, however, is the existence of the switch network 108 along the data channel. The switch network 108 imposes series resistances and/or shunt capacitances that can cause a noticeable (e.g., 1-2 dB) signal loss of the D+, D− differential signal through the switch network 108 during live data transmissions. Here, with the aforementioned sensitivity that high speed data channels have to signal-to-noise ratio, the loss of data signal through the switch network 108 is an undesirable feature of the prior art circuitry of FIGS. 1a through 1f.

It is pertinent to recognize that the existence of the switch network 108 stems from the fact that different calibration voltages need to be applied on the D+ and D− data signal lines when the data, positive error and negative error samplers 105, 106, 107 are being calibrated. That is, as discussed above, when the data sampler 105 is being calibrated, the reference voltage Vcm is presented on both the D+ and D− data signal lines, whereas, when the positive error sampler 106 is being calibrated Vpp is placed on the D+ data signal line and Vpn is placed on the D− data signal line, and whereas, when the negative error sampler 107 is being calibrated Vnn is placed on the D+ signal line and Vnp is placed on the D− signal line.

A solution to the problem is to design both positive and negative error sampler circuits that accept, during calibration, the same Vcm reference voltage on the D+ and D− data lines that the data sampler uses during its calibration. With this innovation, as observed in FIGS. 2a and 2b (and in comparison to the prior art circuits of FIGS. 1a and 1b), the calibration switch network can be eliminated from the channel within the decision unit 203 and, e.g., the adder circuit 214 of the receiver can be modified to include a calibration mode in which it drives the common mode voltage Vcm on both the D+ and D− data lines during calibration for each of the data sampler 205, the positive error sampler 206 and the negative error sampler 207.

FIGS. 2c and 2d respectively show positive and negative error sampler circuits 206, 207 that can be calibrated with Vcm being applied at both the D+ and D− input terminals. For ease of drawing both of FIGS. 2c and 2d do not show the complete RS flip-flop having output Q as depicted in FIG. 1d,e,f. However, the reader should understand that in the embodiments of FIGS. 2c and 2d they are present. Here, in comparison to the error sampler circuits 106, 107 of FIGS. 1e and 1f, the error sampler circuits 206, 207 of FIGS. 2c and 2d have swizzled inputs. That is, the input transistor pair of both differential amplifiers receive both a data signal and a reference voltage. This input arrangement stands in contrast to the differential amplifiers of the prior art error samplers 106, 107 each of which receive only a pair of data signals or reference signals at their respective inputs.

Importantly, although the inputs are swizzled in the new error samplers 206, 207 of FIGS. 2c and 2d, the net logical operation performed by these circuits does not change as compared to their prior art counterparts. In the case of the positive error sampler 206 of FIG. 2c, consider a differential signal of sufficiently high positive amplitude in which D+>D−.

Inset 220 shows a pair of conditions 221 and 222 that pertain to nominal operation of the positive error sampler 206. For both conditions, inset 220 shows the Vpp and Vpn threshold levels where Vpp>Vpn. Here, because the threshold voltages have been swizzled, the linearity of the error sampler 206 is improved as compared to the prior art error sampler 106 because the worst case maximum differential amplitude that either differential pair could be asked to handle has been lessened.

That is, for example, whereas the N1/N2 differential pair of the prior art circuit 106 of FIG. 1e could be asked to handle a maximum differential input voltage of (D+=HI)-(D−=LO), by contrast, in the improved circuit 206 of FIG. 2c, differential pair N1/N2 should only see a worst case differential amplitude of (D+=HI)-(Vpp) and differential pair N3/N4 should only see a worst case differential amplitude of (Vpn)-(D−=LO).

Thus in the overall improved decision circuit, not only is the differential signal strengthened with the elimination of the switching network, but also, the linearity of the error samplers is improved because the input differential pairs N1/N2, N3/N4 are kept in a linear range of operation even under worst case input conditions. Improved linearity can also be viewed as a form of improving the input signal strength (the absence of the non linearity of the prior art circuitry corresponds to stronger preservation of the original input signal). Thus, the improved decision circuit improves the signal strength by way of two different mechanisms.

With respect to inset 220, under the first condition 221 of the inset 220, D+=HI and D−=LO. In this case, N1 of the first differential pair (which receives D+=HI) will be strongly "on" while N2 (which receives Vpp) will be on but not as strongly on as N1. As such, the first differential pair N1/N2 will have a propensity to set S=HI and R=LO. The second differential pair N3/N4, will also have transistor N3 on (because it receives Vpn) and transistor N4 will be on but not as strongly on (because it receives D−=LO). Here, the more strongly on N3 transistor will pull additional current through R that offsets the current through S by transistor N2 to some degree (the difference between the two corresponding to the differential threshold Vpp−Vpn that the positive error sampler 206 makes decisions against). With the current pulled through R by transistor N1 far outweighing the current pulled through S by transistor N4, under condition 221, the circuit will have a strong propensity to set S=HI and R=LO.

Thus, as with the positive error sampler in FIG. 1c, if the circuit observes a strong positive differential amplitude ((D+)-(D−))>(Vpp−Vpn), the circuit will set S=HI and R=LO. By contrast, under condition 222 within inset 220, D+=LO and D−=HI the opposite logical operation takes effect. In this case, N2 will be strongly on (because it receives Vpp) and N1 will only be weakly on (because it receives LO). As such the first differential pair N1/N2 has a strong propensity to set S=LO and R=HI. Additionally, N3 will be weakly on (because it receives Vpn) and N4 will be strongly on (because it receives D−=HI). As such, the current pulled through R by transistor N3 will be offset somewhat by the current pulled through S by transistor N2. This leaves the large amount of current pulled through S by N4 and the weak amount of current pulled through R by N1 to cause the circuit to have a strong propensity to set S=LO and R=HI.

During calibration of the positive error sampler 206, in an embodiment, the D+ and D− inputs and the Vpp and Vpn reference voltages are each set equal to Vcm (i.e., all four input nodes are set equal to one another). Here, the D+ and D− inputs are set to Vcm by the adder circuit 214 of FIG. 2a. In an embodiment, Vpp and Vpn are configured to a level defined by system design, or by system adaptation (the reference level is typically unknown during calibration) during normal operation.

With D, D−, Vpp and Vpn being set to Vcm during calibration the circuit should be balanced and demonstrate a 50% probability to set R=HI and S=LO and a 50% probability to set R=LO and S=HI. If some imbalance is recognized, then, a third parallel differential pair arrangement (not shown in FIG. 2c) can be used to calibrate out the difference. In an embodiment, Vcm is halfway between Vpp and Vpn.

Alternatively, some imbalance may be imposed between Vpp and Vpn to cancel out the offset during calibration. Note that any such imbalance, if imposed, should be additive to any imbalance that is part of the nominal design of the error sampler. For example, as depicted in inset 220, Vpp is nominally set to be greater than Vpn. If there exists an offset during calibration (when Vpp=Vpn=Vcm) in which N1 is more strongly on than N4, Vpp may be set larger than Vpn during calibration (where (Vpp+Vpn)/2 still remains equal to Vcm) to cancel out the offset. The difference between Vpp and Vpn is then added to the nominal difference between Vpp and Vpn observed in inset 220 to cause the circuit to operate with the correct differential threshold without any offset. Likewise, if there exists an offset during calibration (again when Vpp=Vpn=Vcm) in which N4 is more strongly on than N1, Vpp may be set smaller than Vpn during calibration (where (Vpp+Vpn)/2 still remains equal to Vcm) to cancel out the offset. The difference between Vpp and Vpn is then subtracted from the nominal difference between Vpp and Vpn observed in inset 220 to cause the circuit to operate with the correct differential threshold without any offset.

When switching back to operational mode from calibration mode, the error samplers will have negligible offset if the reference inputs are changed from {Vpp=Vcm, Vpn=Vcm} to {Vpp=Vcm+Vref/2, Vpn=Vcm−Vref/2}, whereas in the prior art circuit of FIGS. 1a through 1f, the residue offset can be significant because the prior art circuit is much less linear.

FIG. 2d shows an embodiment of the negative error sampler 207. With respect to inset 230, under the first condition 231 of the inset 230, D−=HI and D+=LO. In this case, N1 of the first differential pair (which receives D−=HI) will be strongly "on" while N2 (which receives Vnn) will be on but not as strongly on as N1. As such, the first differential pair N1/N2 will have a propensity to set S=HI and R=LO. The second differential pair N3/N4, will also have transistor N3 on (because it receives Vnp) and transistor N4 will be on but not as strongly on (because it receives D+=LO). Here, the more strongly on N3 transistor will pull additional current through R that offsets the current through S by transistor N2 to some degree (the difference between the two corresponding to the differential threshold Vnn−Vnp that the positive error sampler 206 makes decisions against). With the current pulled through R by transistor N1 far outweighing the current pulled through S by transistor N4, under condition 231, the circuit will have a strong propensity to set S=HI and R=LO.

Thus, as with the negative error sampler in FIG. 1d, if the circuit observes a strong negative differential amplitude ((D−)-(D+))>(Vnn−Vnp), the circuit will set S=HI and R=LO. By contrast, under condition 232 within inset 230, D−=LO and D+=HI the opposite logical operation takes effect. In this case, N2 will be strongly on (because it receives Vnn) and N1 will only be weakly on (because it receives LO). As such the first differential pair N1/N2 has a strong propensity to set S=LO and R=HI. Additionally, N3 will be weakly on (because it receives Vnp) and N4 will be strongly on (because it receives D+=HI). As such, the current pulled through R by transistor N3 will be offset somewhat by the current pulled through S by transistor N2. This leaves the large amount of current pulled through S by N4 and the weak amount of current pulled through R by N1 to cause the circuit to have a strong propensity to set S=LO and R=HI.

During calibration of the negative error sampler 206, in an embodiment, the D+ and D− inputs and the Vnn and Vnp reference voltages are each set equal to Vcm (i.e., all four input nodes are set equal to one another). Here, the D+ and D− inputs are set to Vcm by the adder circuit 214 of FIG. 2a. In an embodiment, Vnn and Vnp are configured to a level defined by system design, or by system adaptation (the reference level is typically unknown during calibration) during normal operation.

With D, D−, Vnn and Vnp being set to Vcm during calibration the circuit should be balanced and demonstrate a 50% probability to set R=HI and S=LO and a 50% probability to set R=LO and S=HI. If some imbalance is recognized, then, a third parallel differential pair arrangement (not shown in FIG. 2b) can be used to calibrate out the difference. In an embodiment, Vcm is halfway between Vpp and Vpn.

Alternatively, some imbalance may be imposed between Vnn and Vnp to cancel out the offset during calibration. Note that any such imbalance, if imposed, should be additive to any imbalance that is part of the nominal design of the error sampler. For example, as depicted in inset 230, Vnn is nominally set to be greater than Vnp. If there exists an offset during calibration (when Vnn=Vnp=Vcm) in which N1 is more strongly on than N4, Vnn may be set larger than Vnp during calibration (where (Vnn+Vnp)/2 still remains equal to Vcm) to cancel out the offset. The difference between Vnn and Vnp is then added to the nominal difference between Vnn and Vnp observed in inset 220 to cause the circuit to operate with the correct differential threshold without any offset. Likewise, if there exists an offset during calibration (again when Vnn=Vnp=Vcm) in which N4 is more strongly on than N1, Vnn may be set smaller than Vnp during calibration (where (Vnn+Vnp)/2 still remains equal to Vcm) to cancel out the offset. The difference between Vnn and Vnp is then subtracted from the nominal difference between Vnn and Vnp observed in inset 220 to cause the circuit to operate with the correct differential threshold without any offset.

When switching back to operational mode from calibration mode, the error samplers will have negligible offset if the reference inputs are changed from {Vnn=Vcm, Vnp=Vcm} to {Vnn=Vcm+Vref/2, Vnp=Vcm−Vref/2}, whereas in the prior art circuit of FIGS. 1a through 1f, the residue offset can be significant because the prior art circuit is much less linear.

In various embodiments, Vpp, Vpn, Vnn and Vnp are set by digital to analog converter circuits which have not been shown for illustrative convenience.

FIG. 3 shows a depiction of an exemplary computing system 300 such as a personal computing system (e.g., desktop or laptop) or a mobile or handheld computing system such as a tablet device or smartphone, or, a larger computing system such as a server computing system. As observed in FIG. 3, the basic computing system may include a central processing unit 301 (which may include, e.g., a plurality of general purpose processing cores and a main memory controller disposed on an applications processor or multi-core processor), system memory 302, a display 303 (e.g., touchscreen, flat-panel), a local wired point-to-point link (e.g., USB) interface 304, various network I/O functions 305 (such as an Ethernet interface and/or cellular modem subsystem), a wireless local area network (e.g., WiFi) interface 306, a wireless point-to-point link (e.g., Bluetooth) interface 307 and a Global Positioning System interface 308, various sensors 309_1 through 309_N (e.g., one or more of a gyroscope, an accelerometer, a magnetometer, a temperature sensor, a pressure sensor, a humidity sensor, etc.), a camera 310, a battery 311, a power management control unit 312, a speaker and microphone 313 and an audio coder/decoder 314.

An applications processor or multi-core processor 350 may include one or more general purpose processing cores 315 within its CPU 301, one or more graphical processing units 316, a memory management function 317 (e.g., a memory controller) and an I/O control function 318. The general purpose processing cores 315 typically execute the operating system and application software of the computing system. The graphics processing units 316 typically execute graphics intensive functions to, e.g., generate graphics information that is presented on the display 303. The memory control function 317 interfaces with the system memory 302. The system memory 302 may be a multi-level system memory such as the multi-level system memory discussed at length above.

Each of the touchscreen display 303, the communication interfaces 304-307, the GPS interface 308, the sensors 309, the camera 310, and the speaker/microphone codec 313, 314 all can be viewed as various forms of I/O (input and/or output) relative to the overall computing system including, where appropriate, an integrated peripheral device as well (e.g., the camera 310). Depending on implementation, various ones of these I/O components may be integrated on the applications processor/multi-core processor 350 or may be located off the die or outside the package of the applications processor/multi-core processor 350. The mass storage of the computing system may be implemented with non volatile storage 320 which may be coupled to the I/O controller 318 (which may also be referred to as a peripheral control hub).

A receiver having a decision unit with a data sampler and positive and negative error samplers that each use a same calibration voltage as described at length above may be integrated into, e.g., any point-to-point link within the computing system. Here, a point-to-point link may be found, e.g., between processing cores, between a processing core and a main memory controller, between a memory controller and a memory device, between a memory controller and a graphics processing unit, between a display driver and a display, between a memory controller and an I/O control hub, between an I/O control hub and an I/O interface (e.g., a network interface), a network interface and a network that the computing system connects to, a storage controller and a mass storage device, etc.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), digital signal processors (DSP), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising
a receiver comprising a) and b) below:
   a) a data sampler, a positive error sampler and a negative error sampler each having respective inputs coupled to a same differential channel;
   b) summation circuitry that precedes the data sampler, the positive error sampler and the negative error sampler along the differential channel, the summation circuitry to drive the respective inputs, the summation circuitry to place a same calibration voltage on the differential channel to calibrate each of the data sampler, positive error sampler and negative error sampler with the same calibration voltage, the summation circuitry to receive the differential channel's common mode voltage and a feedback signal of the receiver.

2. The apparatus of claim 1 where the receiver is a decision feedback equalizer receiver.

3. The apparatus of claim 2 wherein the data sampler, positive error sampler and negative error sampler are within a decision unit of the decision feedback equalizer receiver.

4. The apparatus of claim 1 wherein the calibration voltage is the common mode voltage of the differential channel.

5. The apparatus of claim 1 wherein at least one of the positive and negative error samplers comprises first and second differential transistor pairs, wherein a first of the differential transistor pairs includes a first transistor coupled to receive a first signal of the differential channel and a second transistor coupled to receive a first reference voltage, and wherein a second of the differential transistors pairs includes a first transistor coupled to receive a second signal of the differential channel and a second transistor coupled to receive a second reference voltage.

6. The apparatus of claim 1 wherein at least one of the positive and negative error samplers comprises first and second differential transistor pairs, wherein a first of the differential pairs is responsive to whether a first signal of the differential channel is greater than a first reference voltage and a second of the differential pairs is responsive to whether a second signal of the differential channel is beneath a second reference voltage.

7. An apparatus, comprising
a receiver comprising a) and b) below:
   a) a data sampler, a positive error sampler and a negative error sampler each having respective inputs coupled to a same differential channel;
   b) summation circuitry that precedes the data sampler, the positive error sampler and the negative error sampler along the differential channel, the summation circuitry to drive the respective inputs, the summation circuitry to place a same calibration voltage on the differential channel to calibrate each of the data sampler, positive error sampler and negative error sampler with the same calibration voltage and wherein a calibration switch does not reside along the differential channel between the summation circuitry and the data sampler, positive error sampler and negative error sampler, the summation circuitry to receive the differential channel's common mode voltage and a feedback signal of the receiver.

8. The apparatus of claim 7 where the receiver is a decision feedback equalizer receiver.

9. The apparatus of claim 8 wherein the data sampler, positive error sampler and negative error sampler are within a decision unit of the decision feedback equalizer receiver.

10. The apparatus of claim 7 wherein the calibration voltage is the common mode voltage of the differential channel.

11. The apparatus of claim 7 wherein at least one of the positive and negative error samplers comprises first and second differential transistor pairs, wherein a first of the differential transistor pairs includes a first transistor coupled to receive a first signal of the differential channel and a second transistor coupled to receive a first reference voltage, and wherein a second of the differential transistors pairs includes a first transistor coupled to receive a second signal of the differential channel and a second transistor coupled to receive a second reference voltage.

12. The apparatus of claim 7 wherein at least one of the positive and negative error samplers comprises first and second differential transistor pairs, wherein a first of the differential pairs is responsive to whether a first signal of the differential channel is greater than a first reference voltage and a second of the differential pairs is responsive to whether a second signal of the differential channel is beneath a second reference voltage.

13. A computing system, comprising:
a plurality of processing cores;
a memory controller coupled the processing cores;
a system memory coupled to the memory controller;
a point-to-point link comprising a receiver, the receiver comprising a) and b) below:
   a) a data sampler, a positive error sampler and a negative error sampler each having respective inputs coupled to a same differential channel;
   b) summation circuitry that precedes the data sampler, the positive error sampler and the negative error sampler along the differential channel, the summation circuitry to drive the respective inputs, the summation circuitry to place a same calibration voltage on the differential channel to calibrate each of the data sampler, positive error sampler and negative error sampler with the same calibration voltage, the summation circuitry to receive the differential channel's common mode voltage and a feedback signal of the receiver.

14. The computing system of claim 13 where the receiver is a decision feedback equalizer receiver.

15. The computing system of claim 13 wherein the calibration voltage is the common mode voltage of the differential channel.

16. The computing system of claim 13 wherein at least one of the positive and negative error samplers comprises first and second differential transistor pairs, wherein a first of the differential transistor pairs includes a first transistor coupled to receive a first signal of the differential channel and a second transistor coupled to receive a first reference voltage, and wherein a second of the differential transistors pairs includes a first transistor coupled to receive a second signal of the differential channel and a second transistor coupled to receive a second reference voltage.

17. The computing system of claim 13 wherein at least one of the positive and negative error samplers comprises first and second differential transistor pairs, wherein a first of the differential pairs is responsive to whether a first signal of the differential channel is greater than a first reference voltage and a second of the differential pairs is responsive to whether a second signal of the differential channel is beneath a second reference voltage.

* * * * *